United States Patent [19]

Matsumoto

[11] Patent Number: 4,704,633

[45] Date of Patent: Nov. 3, 1987

[54] METHOD FOR READING OUT IMAGE INFORMATION ON AN IMAGE HAVING A WIDE DYNAMIC RANGE

[75] Inventor: Fumio Matsumoto, Tokyo, Japan

[73] Assignee: Fuji Photo Film Co., Ltd., Kanagawa, Japan

[21] Appl. No.: 831,440

[22] Filed: Feb. 20, 1986

[30] Foreign Application Priority Data

Apr. 1, 1985 [JP] Japan .................................. 60-68856
Jul. 12, 1985 [JP] Japan .................................. 60-153725
Nov. 9, 1985 [JP] Japan .................................. 60-251575

[51] Int. Cl.$^4$ ................................................. H04N 3/14
[52] U.S. Cl. ................................. 358/213.27; 358/169
[58] Field of Search ............... 358/209, 214, 212-213, 358/211, 228, 169

[56] References Cited

U.S. PATENT DOCUMENTS

| | | | |
|---|---|---|---|
| 3,988,602 | 10/1976 | Gorsica, Jr. ........................ | 358/214 |
| 4,418,362 | 11/1983 | Nadler ................................ | 358/213 |
| 4,556,912 | 12/1985 | Yamanaka et al. ................. | 358/228 |
| 4,584,606 | 4/1986 | Nagasaki ............................ | 358/209 |
| 4,614,966 | 9/1986 | Yunoki et al. ..................... | 358/211 |

*Primary Examiner*—Gene Z. Rubinson
*Assistant Examiner*—Stephen Brinich
*Attorney, Agent, or Firm*—Wenderoth, Lind & Ponack

[57] ABSTRACT

A method for reading out image information with a storage type photoelectric conversion element which operates in response to clock pulses in the mode cycle of photoelectric conversion/storage, transfer, holding, and reading out. In the photoelectric conversion/storage mode, the mode of the photoelectric conversion/storage alone is continued for a predetermined number of clock pulses and conversion tables corresponding to the output signal from the storage type photoelectric conversion element are switched in correspondence with the predetermined number of clock pulses so as to thereby obtain image information of an image having a wide dynamic range. This allows the obtaining of image information with a simple structure and at a relatively high processing speed and with a high resolution.

11 Claims, 18 Drawing Figures

| 14 | 40 | 86 | 99 | --- |
|----|----|----|-----|---|
| 60 | 25 | 51 | 121 | |
| 73 | 0  | 36 | 138 | |
| ⋮  |    |    |     | |
| ⋮  |    |    |     | |

| 0 | 1 | 1 | 0 | 0 |
|---|---|---|---|---|
| 0 | 0 | 1 | 0 | 0 |
| 0 | 0 | 1 | 1 | 0 |
| 1 | 0 | 3 | 2 | 0 |
| 0 | 0 | 0 | 1 | 1 |

| 14 | 39 | 85 | 99 | --- |
|----|----|----|-----|---|
| 60 | 25 | 50 | 121 | |
| 73 | 0  | 35 | 137 | |
| ⋮  |    |    |     | |
| ⋮  |    |    |     | |

FIG. 10A

TABLE #0

| 14 | 40 | 85 | 100 | --- |
|----|----|----|----|-----|
| 60 | 25 | 51 | 119 | --- |
| 73 | 0  | 36 | 136 | --- |
| ⋮  | ⋮  | ⋮  | ⋮  | ╲ |

LIMIT VALUE FOR RESOLUTION 77

FIG. 10B

TABLE #5

| 51 | 51 | 86 | 99  | --- |
|----|----|----|-----|-----|
| 51 | 51 | 51 | 121 | --- |
| 51 | 51 | 51 | 139 | --- |
| ⋮  | ⋮  | ⋮  | ⋮  | ╲ |

LIMIT VALUE FOR RESOLUTION 133

FIG. 10C

TABLE #10

| 103 | 103 | 103 | 103 | --- |
|-----|-----|-----|-----|-----|
| 103 | 103 | 103 | 103 | --- |
| 103 | 103 | 103 | 138 | --- |
| ⋮   | ⋮   | ⋮   | ⋮   | ╲ |

LIMIT VALUE FOR RESOLUTION 192

FIG. 10D

| 14 | 40 | 86 | 99  | --- |
|----|----|----|-----|-----|
| 60 | 25 | 51 | 121 | --- |
| 73 | 0  | 36 | 138 | --- |
| ⋮  | ⋮  | ⋮  | ⋮  | ╲ |

METHOD FOR READING OUT IMAGE INFORMATION ON AN IMAGE HAVING A WIDE DYNAMIC RANGE

BACKGROUND OF THE INVENTION

The present invention relates to a method for reading out image information in digital values by means of a photoelectric conversion element which is capable of detecting and reading image information in a wide dynamic range and at high resolution by the steps of sequentially renewing the conversion tables to corresponds to anti-logarithmic values which are outputted from the photoelectric conversion element, adjusting the photoelectric conversion element in the sensitivity area thereof, and photometrically measuring in plural times within the range of sensitivity where the photoelectric conversion element has sufficient resolution, and combining and synthesizing thus obtained image information in the unit of pixels.

Along with the advance of solid device technology centering around integrated circuits, the technology of image sensors has seen a remarkable progress. However, image sensors per se are yet to be satisfied, which necessitates additional devices on the side of applicants. The image information reading system becomes, as a result, complicated and costly. When image information is read in a wide dynamic range, photodiodes and photoelectric multiplier tubes are generally used, but the structure of scanning mechanism unavoidably becomes complicated, making the size of the system bulky as well as pushing the total cost up. In the case where a storage type photoelectric conversion element (referred to simply as an "image sensor" hereinafter) comprising CCD (charge coupled device) or MOS (metal oxide semiconductor) is applied, the cost relative to the number of pixels can be reduced. It also permits electric scanning to thereby make the structure simple and the size compact. For these advantages, the latter type is increasingly used in recent years. However, the above system is not free of structural defects. As the dynamic range of the image sensor per se is narrow, other devices should be added to supplement it. This method inconveniently prolongs the time necessary for reading and pushes up the cost. Therefore, the image sensor with the CCD or the MOS has not heretofore been utilized for the purpose of precisely detecting image information on a photographic film and so on which have a wide dynamic range from under exposed negative film to over exposed negative film.

As a reading method with the image sensor such as the CCD, the method generally comprises the mode cycles of photoelectric conversion, storage, transfer, holding and reading out. The dynamic range of such a system can be expanded by adjusting sensitivity in time for the above mentioned cycles from photoelectric conversion, storage, transfer and holding by varying the frequencies of drive basic clocks of the image sensor and changing charge storage time in photoelectric conversion continuously or stepwise.

FIG. 1 shows the general driving and reading system of an image sensor wherein an image sensor 10 comprises a photoelectric conversion/storage section 11 which receives light from images, conducts photoelectric conversion and stores charges, a holding section 12 which has the charges transferred from the photoelectric conversion/storage section 11 and holds them, and a reading out register 12 which outputs the charges held in the holding section 12 as image signals PS in the form of snalog. A pulse oscillator 1 generates the basic clocks 4 fcp of predetermined frequencies (e.g. 6 MHz), the basic clocks 4fcp are inputted to a drive timing section 2 to generate clock signals CK ($\phi$I, $\phi$S, $\phi$R) for driving the image sensor 10 as well as generates and outputs signals SP, Hsync and Vsync which indicate the state of the image sensor 10 or pixels signals SP corresponding to one pixels of the image sensor 10, horizontal synchronous signals Hsync corresponding to one scanning line thereof, and vertical synchronous signals Vsync corresponding to the scanning of one frame thereof. The clock signals CK inputted to the image sensor 10 comprises a four-phase signal $\phi$I ($\phi$I1 to $\phi$I4) which drives the photoelectric conversion/storage section 11, a phase signal $\phi$S ($\phi$S1 to $\phi$S4) of for instance, four phases which drives the holding section 12 and a phase signal $\phi$R ($\phi$R1 to $\phi$R4) of four phases, for instance, which drives the reading out register 13. They are of the same frequencies obtained by dividing the basic clocks 4fcp (for instance, 1.5 MHz), but respective phase signals ($\phi$I1 to $\phi$I4, $\phi$S1 to $\phi$S4 and $\phi$R1 to $\phi$R4) are deviated in phase by a predetermined relation. The image signals PS read out of the image sensor 10 are converted by an A/D (analog-to-digital) converter 21 in an operational processing section 20 into a digital anti-logarithmic values PSD, the anti-logarithmic values PSD then converted into digital densities DS by a logarithmic converter 22, and stored in a memory 23. Pixels signals SP, horizontal synchronous signals Hsync and vertical synchronous signals Vsync from the drive timing section 2 are inputted to the operational processing section 20 for processing in accordance with the operational mode of the image sensor 10.

With the structure mentioned above, input light is usually photoelectrically converted, stored (IA) and the stored charges are transferred, held and read out (RA) in synchronization with clock signals CK as shown in FIG. 2A. If the frequency of the clock signals CK is lowered by one-half in order to expand the dynamic range of the system, the photoelectric conversion/storage (IA) is extended in correspondence with the clock signals CK as shown in FIG. 2B, and the sensitivity can be adjusted or enhanced from R1 to R2 per range as shown in FIG. 3. However, this inevitably entails prolongation of transfer, holding and reading times (RA), presenting such problems as increase of dark current and occurrence of smear (or mixture of charges during transfer) during transfer and holding.

FIG. 3 shows the relation between the dynamic range FDR which is required for high density images and actual dynamic range CFR which the image sensor 10 has corresponding to low density images. The dynamic range can be shifted from R1 to R2 by varying the storage time to achieve a wider comprehensive dynamic range SDR (=R1+R2) as the system. In this case, however, the range used as the system is R1 or R2 in FIG. 3. In order to digitally process the images detected in either range, signals are converted into quantized data by the A/D converter 21 and then to density data by the logarithmic converter 22. The resolution inevitably becomes insufficient in the high density range where data is relatively expanded compared to the low density side. Further, even though the sensitivity of the image sensor 10 can be increased further by lowering the frequency of the clock signals CK to expand the dynamic range, this present a problem in that much time is needed for reading out overall image information.

SUMMARY OF THE INVENTION

This invention is contrived to obviate aforementioned prior art problem and aims at providing a method for reading out images at high resolution which is capable of processing image data at a relatively high speed, reading out images precisely and has a dynamic range wide in a system enough to process image information.

Another object of this invention is to provide a method for reading out image information which has a wide dynamic range with a simle structure and which is capable of stably obtaining image density values at a high resolution.

According to this invention in one aspect thereof, for achieving objects described above, there is provided a method for reading out image information with a storage type photoelectric conversion element which operates in the mode cycle of photoelectric conversion/storage, transfer, holding and reading-out which is characterized in that in the mode of said photoelectric conversion/storage, said photoelectric conversion/storage alone is repeated for a predetermined number of times before the modes of said transfer, holding and reading out, thereby to obtain the image information of a wide dynamic range on a system.

According to this invention in another aspect thereof, there is provided a method for reading out image information with a storage type photoelectric conversion element which operates in the mode cycle of photoelectric conversion/storage, transfer, holding and reading-out which is characterized in that in the mode of said photoelectric conversion/storage, the mode of the photoelectric conversion/storage alone is continued for the predetermined number of clocks, and conversion tables corresponding to the output signal from said storage type photoelectric conversion element are switched in correspondence with said predetermined number, so as to obtain image information of a wide dynamic range on a system.

Further, according to this invention in still another aspect thereof, there is provided a method for reading out image information through detection of digital image data by means of a photoelectric conversion element comprising the steps of: preparing a plural number of conversion tables for each of predetermined ranges to correspond to anti-logarithmic value data outputted from said photoelectric conversion element: setting a limit value for each of said conversion tables to define the margin of sufficient resolution: sequentially updating said conversion in a manner to make the photometric data of said photoelectric conversion element remain within the limit value of each of said conversion tables: sequentially switching sensitivity of said photoelectric conversion element in the same manner; photometrically measuring said image information for plural times in the scope of sufficient sensitivity of said photoelectric conversion element; and processing the detected image data for synthesis thereby to obtain image information of a wide dynamic at high resolution.

Still further, according to this invention in another aspect thereof, there is provided a method for reading out image information through detection of digital image information with a photoelectric conversion element comprising the steps of: storing calibration data measured photometrically at a reference condition in a memory; preparing a plural number of conversion tables for each of predetermined ranges to correspond to anti-logarithmic value data outputted from said photoelectric conversion element; setting a limit value for each of said conversion tables to define the scope of sufficient resolution; sequentially updating said conversion tables in a manner to make the photometric data of said photoelectric conversion element remain within the limit value of each of said conversion tables; sequentially switching sensitivity of said photoelectric conversion element in the same manner; detecting said image data for plural times in the range of sensitivity with sufficient resolution of said photoelectric conversion element; and synthesizing and processing each of the detected data together with said calibration data to form image information.

The nature, principle and utility of the invention will become more apparent from the following detailed description when read in conjunction with the accompanying drawings.

BRIEF DESCRIPTION OF THE DRAWINGS

In the accompanying drawings:

FIGS. 10A through 10D are memory charts to explain the reading out method according to this invention.

DETAILED DESCRIPTION OF THE PREFERRED EMBODIMENTS

The dynamic range of an image sensor per se such as a CODF is determined by the ratio of saturation level against noise level and is usually limited to the ratio of 1 : several tens. The apparent dynamic range can be expanded by adjusting the sensitivity of the image sensor to correspond to the brightness of orginal pictures and scanning images. However, the scope having resolution sufficient for digital image information is limited. According to this invention, therefore, sensor pixels corresponding to each pixel of the film images are sequentially adjusted to correspond to the optimum sensitivity range of the image sensor by conducting photometry and detection processes at plural times sequentially at different sensitivities. Logarithmic tables are switched for every photometric and detecting process, and the data obtained are synthesized later in a memory so as to obtain digital image density data of a wider dynamic range at sufficient high resolution.

Figure 1:
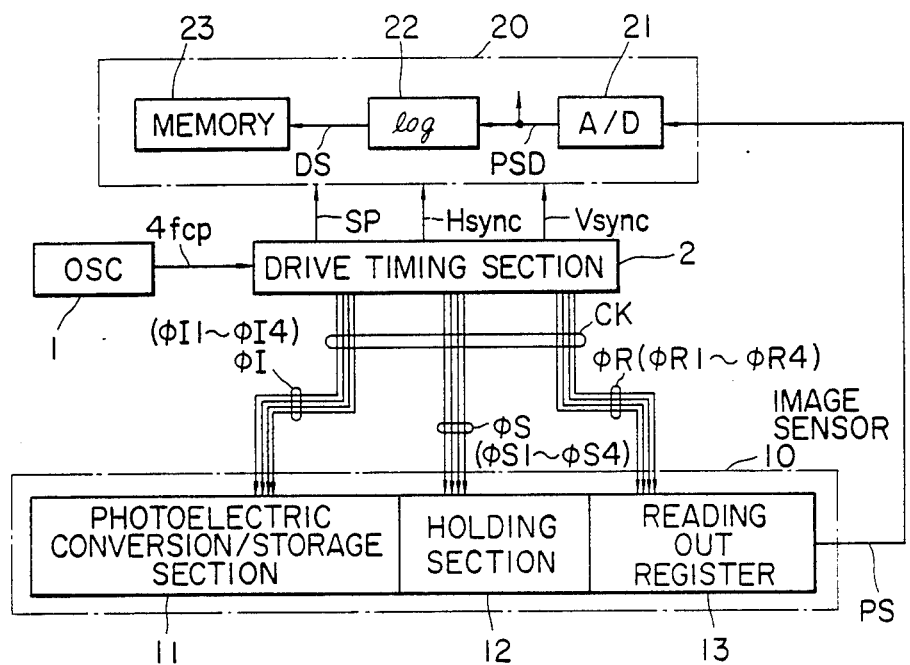
FIG. 1 is a block diagram to show one example of the driving system of a prior art image sensor.
Figure 4:
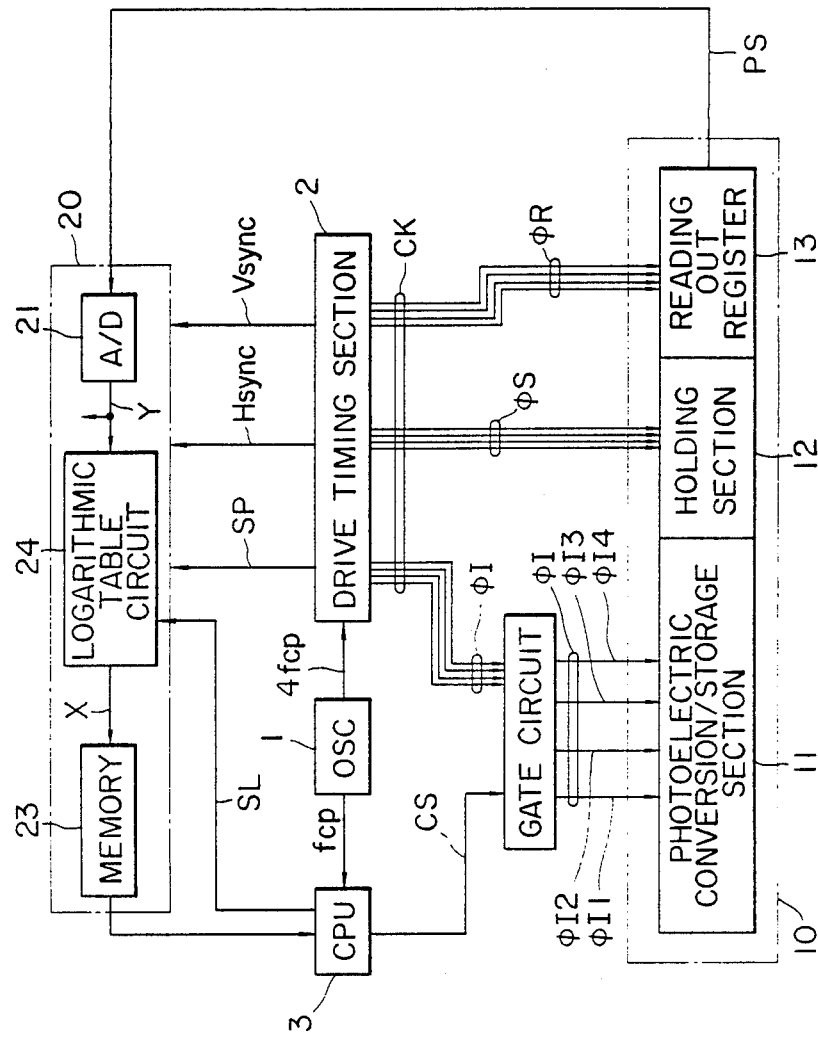
FIG. 4 is a block diagram to show one example of the drivings system of this invention image sensor.

FIG. 4 is a block diagram to show, corresponding to FIG. 1, an embodiment of the device to which this invention method is applied. In this embodiment, a four-phase signal φI (φI1 to φI4) which is outputted from a drive timing section 2 is fed to a photoelectric conversion/storage section 11 of the image sensor 10 via a gate circuit 4 which is controlled by controlling signals CS from a controlling means 3 which comprises a CPU (Central Processing Unit) and so on. The controlling means 3 is operatively connected to the operational processing section 20 so as to be able to grasp the operational status of the image sensor 10 based on pixel signals SP, horizontal synchronous signals Hsync and vertical synchronous signals Vsync for processing the image information. This permits the controlling means 3 to output controlling signals CS in synchronization with the vertical synchronous signals Vsync or with the scanning of one frame. Further, selective signals SL corresponding to the controlling signals CS are outputted from the controlling means 3 to the logarithmic table circuit 24 in the operational processing section 20.

Figure 5:
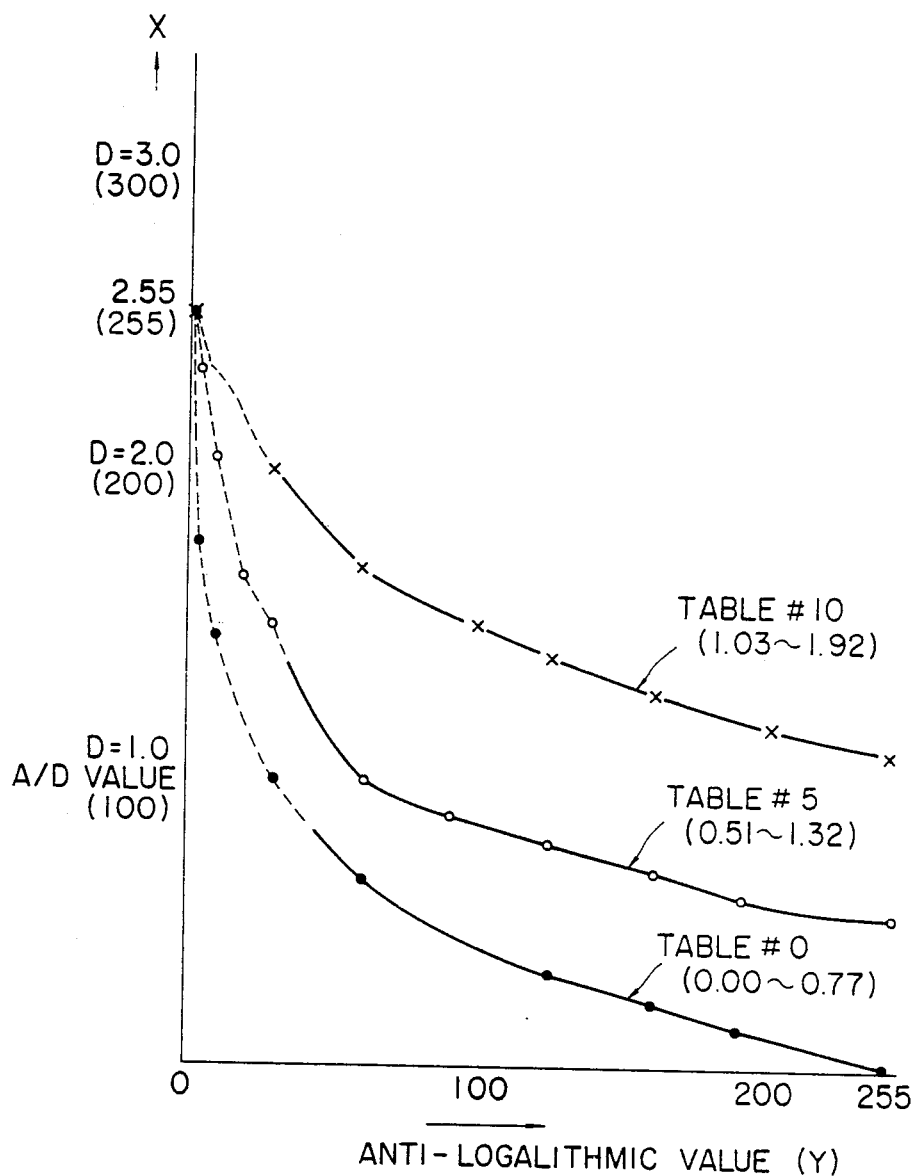
FIGS. 5 and 6 are charts and a graph to explain logarithmic tables according to this invention.

Explanation will now be given to the contents of the logarithmic tables in the logarithmic table circuit 24 comprising an ROM (read only memory). For instance, FIG. 5 shows the relation between the anti-logarithmic value Y vs. the density value X. If the output from the A/D converter 21 is 8 bits (0 to 225) and the density resolution is "0.01", the range of "0.00" to "0.77" in density is the effective range for the density resolution of "0.01" at the table #0. Similarly, at the table #5, the effective range is the range of "0.51" to "1.32" for the density resolution "0.01" while at the table #10, it is the range of "1.03" to "1.92" in density for the density resolution of "0.01". Accordingly, if these tables of effective ranges are prepared in a given number for necessary scope of density, the density values uo to "2.55" at which A/D converter 21 of 8 bits is saturated can be converted to the density values X precisely at the high resolution of "0.01" without being significantly affected by noise such as dark current or offset. The portions defined with dotted lines in FIG. 5 are extremely inferior in resolution to the portions defined with solid lines and precision in digital processing in the portions becomes very unstable. However, by combining solid line portions of the tables #0 and #5 in a suitable manner, the density range of D="0.00" to "1.32" can be read out at the resolution of "0.01" even if the dynamic range of the image sensor is at 1.0 or below (10:1). The dynamic range R1 of the SDR (=R1+R2) in FIG. 3 corresponds to the table #0, and R2 to the table #5. A wide dynamic range and high resolution can actually be simply achieved by combining the ranges R1 and R2.

In the structure mentioned above, the basic clocks 4fcp from the pulse oscillator 1 are inputted to the drive timing section 2 to generate clock signals CK and status signals of pixel signals SP, horizontal synchronous signals Hsync and vertical synchronous signals Vsync. The phase signals φS and φR out of the clock signals CK are directly supplied respectively to the holding section 12 and the reading out register 13 of the image sensor 10 and the phase signal φI thereof is applied at the photoelectric conversion/storage section 11 via the gate circuit 4 in a manner similar to the above. Image signals PS from the image sensor 10 are inputted to and processed at the operational processing section 20 in the same manner as above. The controlling means 3 judges the operational status of the image sensor 10 via the operational processing section 20 or the cycle modes of photoelectric conversion, storage, transfer, holding or reading out, and switched the controlling signals CS to control the gate circuit 4. The status signals (SP, Hsync, Vsync) from the drive timing section 2 may be directly inputted to the controlling means 3.

Figure 2A:
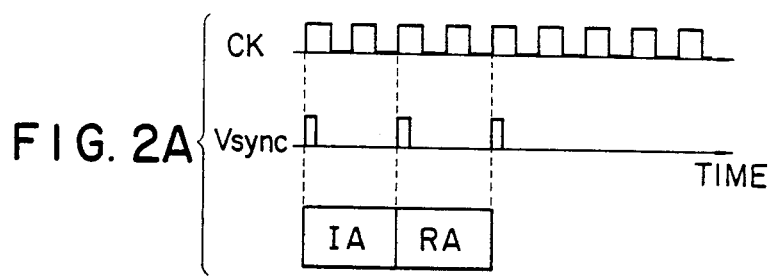
FIGS. 2A through 2C are charts to explain operations of the image sensor, respectively.
Figure 2B:
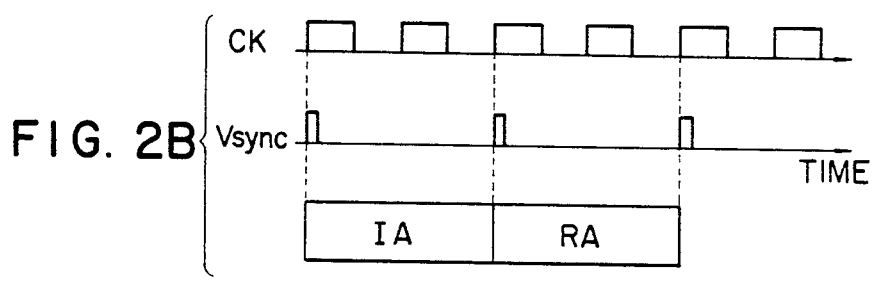
Figure 2C:
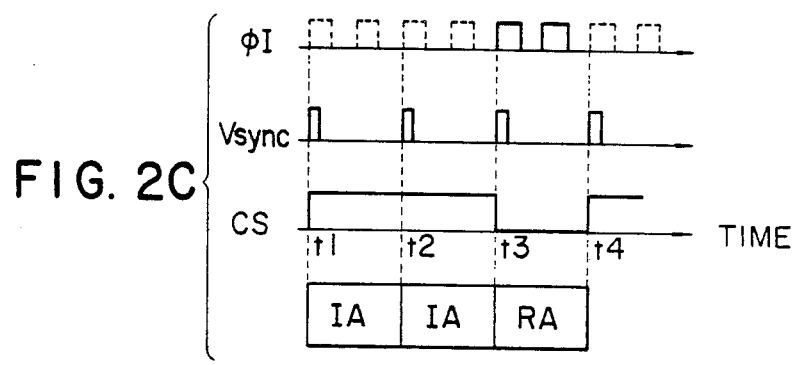

When the controlling means 3 detects the mode of photoelectric conversion/storage of the image sensor 10 and switches the gate circuit 4 with the controlling signals CS, the phase signals φI1 to φI4 from the gate circuit 4 are fixed at predetermined combination of logic "L" or "H", for example, φI1="L", φI2="L", φI3="H" and φI4="H", and are fed to the photoelectric conversion/storage section 11. The phase signals φS and φR have been inputted to the holding section 12 and the reading out register 13. If the phase signals φI1 through φI4 from the gate circuit 4 are fixed by the controlling signals CS in synchronization with the vertical synchronous signals Vsync outputted in correspondence with the scanning of one frame, the mode of photoelectric conversion/storage alone can be repeated for plural times (two times in this example) as shown in FIG. 2C. In other words, when it judges the mode of the image sensor 10 as the photoelectric conversion/storage, or at the time point t1, the controlling means 3 gives the controlling signals CS to the gate circuit 4 to fix the phase signals φI1 through φI4 at a predetermined combination of logical levels for conducting photoelectric conversion and storage. After having conducted photoelectric conversion/storage for plural times in synchronization with vertical synchronous signals Vsync, the controlling means 3 erases the controlling signals CS and resets the gate circuit 4 (time point t3), and applies the phase signal φI from the drive timing section 2 to the photoelectric conversion/storage section 11 as it is. Consequently, the image sensor 10 transfers, holds and reads out the charges which have been stored at the time point t3, and proceeds to the next operation at the time point t4 when the next vertical synchronous signal Vsync is inputted.

According to this invention, in correspondence with the control of the gate circuit 4 with the controlling signals CS, the controlling means 3 selects a logarithmic table in the logarithmic table circuit 24 with the selective signal SL.

The logarithmic tables can be in advance set in the following manner. It is assumed here that the logarithm is common logarithms with "10" as the base, and the basic storage time of the image sensor 10 is denoted as TB, the photometric storage time TX, the A/D conversion values Y (anti-logarithmic value), at photometric scanning (referred to as "major scanning" hereinbelow) by using the logarithmic tables, the photometric density value from the logarithmic table circuit 24 is denoted as X, the luminance value P, storage time coefficient a, the number of logarithmic tables Tn, density coefficient K, the serial number (or page) of the logarithmic tables n, the maximum anti-logarithmic conversion value at the time of photometry (referred to as "pre-scanning" hereinbelow) for selecting a logarithmic conversion table with anti-logarithmic table is denoted as YP, the A/D referrence value at the base luminance is denoted as PB, and the desired dynamic range is denoted as D. As the dynamic range is expressed by D and the number of logarithmic tables is expressed by Tn, the storage time coefficient can be defined as $$a = (D)1/Tn \quad (1)$$

The basic storage time TB is set prior to the photometry of the original film but at the time of operation of calibration which detects data for calibration with the reference film. The reference density of the film base is generally set at zero and the base luminance PB is first photometrically measured in order to enhance resolution of image information. The basic storage time TB which corresponds to the base luminance PB is selected by sequentially extending the time upward from the minimum time which can obtain image information with the image sensor so that the A/D conversion value becomes (M=α) giving allowance to the anti-logarithmic saturation output of the A/D converter 21. The selection of the basic storage time TB will further be described hereinafter in relation to the flow chart in FIG. 7.

Then, the photometric storage time TX is set, if necessary, by the pre-scanning. The photometric storage time TX may be determined by using an anti-logarithmic table for the original picture film to be measured, using as address data the maximum luminance value YP of the anti-logarithmic outputs Y of the A/D converter 21 thus obtained at the basic storage time TB, and using the value n which is determined with the pre-scanning table. More particularly, the relation holds as following.

$$TX = TB \cdot a^n \tag{2}$$

The A/D conversion value YP determined with the basic storage time TB in the above equation (2) can be expressed as $YP = PB \cdot a^n$. This expression can be converted as following.

$$\log YP = \log (PB/a^n) \tag{3}$$

$$= \log PB - n \cdot \log a$$

Therefore, the above expression holds as $$n \cdot \log a = \log PB - \log YP \tag{4}$$

and the relation can be expressed as below $$n = (\log PB - \log YP)/\log a \tag{5}$$

the value n is obtained by rounding off at decimal point. The logarithmic table number n which is selected by the pre-scanning table memory obtained by the above expression (5) with the A/D conversion maximum luminance YP at the pre-scanning as the address data is thus determined. The value of table number n is suitably set in a manner to prevent being affected by dark current along with the increase of storage time.

If the photometric luminance value is denoted as P, the A/D conversion value Y at the major scanning is expressed as below:

$$Y = P \times a^n \tag{6}$$

As the photometric density value X is a common logarithm of the reciprocal number of a luminance ratio, the relation between the A/D reference value PB of the base luminance and the photometric luminance value P and the photometric density value X can be defined as below.

$$X = K \cdot \log PB/P \tag{7}$$

As the relation $P = Y/a^n$ holds by converting the above (6), the expression (7) can be converted to $$X = K \cdot \log \{PB/(Y/a^n)\} \tag{8}$$

$$= K \cdot \log (PB \cdot a^n/Y)$$

$$= K \cdot \log (Y/PB \cdot a^n)^{-1}$$

$$= -K[\log Y - \log PB - n \cdot \log a]$$

$$= K [\log PB - \log Y + n \cdot \log a]$$

and to $$X = K \cdot \log PB + N \cdot K \cdot \log a - K \cdot \log Y \tag{9}$$

The density photometric value X can be determined by using as address data the logarithmic table number n which is determined at the prescanning and the A/D conversion value Y at the time of major scanning and selecting with logarithmic table memory which is obtained from the expression (9) above.

Figures 6, 9A, 9B, 9C:
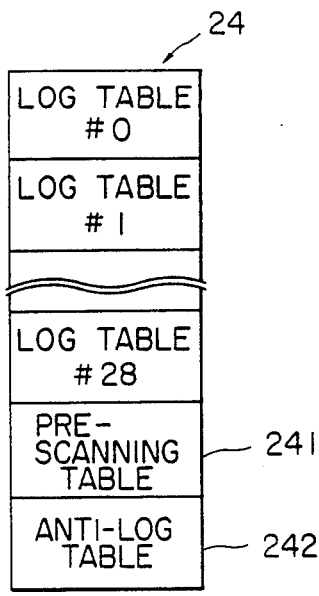
FIGS. 9A through 9C are charts to explain the calibration of the image sensor.

FIG. 6 shows the construction of the logarithmic table circuit 24. logarithmic tables are prepared in the number of 29 from #0 to #28, and a pre-scanning table 241 and an anti-logarithmic table 242 which outputs input and output at the ratio of 1:1 are prepared. In the case of 8 bit processing, address is from "0" to "255", and the pre-scanning table 241 selects the table number n to satisfy the relation below:

$$n = (\log 250 - \log YP)/1.269 \tag{10}$$

If it is assumed that the required dynamic range D is set at 1:1000, the storage time coefficient a becomes as below from the expression (1) above:

$$a = (1000)^{1/29} = 1.269$$

and therefore the above expression (10) is obtained. If it is assumed that the logarithmic tables #0 through #28 are respectively structured for 256 bytes, the density value X may be obtained by the following relation:

$$X = 100 \cdot \log 250 + n \cdot 100 \log (1.269) - 100 \cdot \log Y \tag{11}$$

and read out with respective addresses "0" through "255" corresponding to logarithmic tables #0 through #28. If the density value D=0.01 is corresponded to the A/D conversion output "1", the relation holds as K=1/0.01=100. The density coefficient K may be determined by compromising the necessary resolution with dynamic range. In the case of 8 bit processing, the density value X is clipped at "255", and rounded off at the decimal point. X becomes 255 when Y=0.

Figure 7:
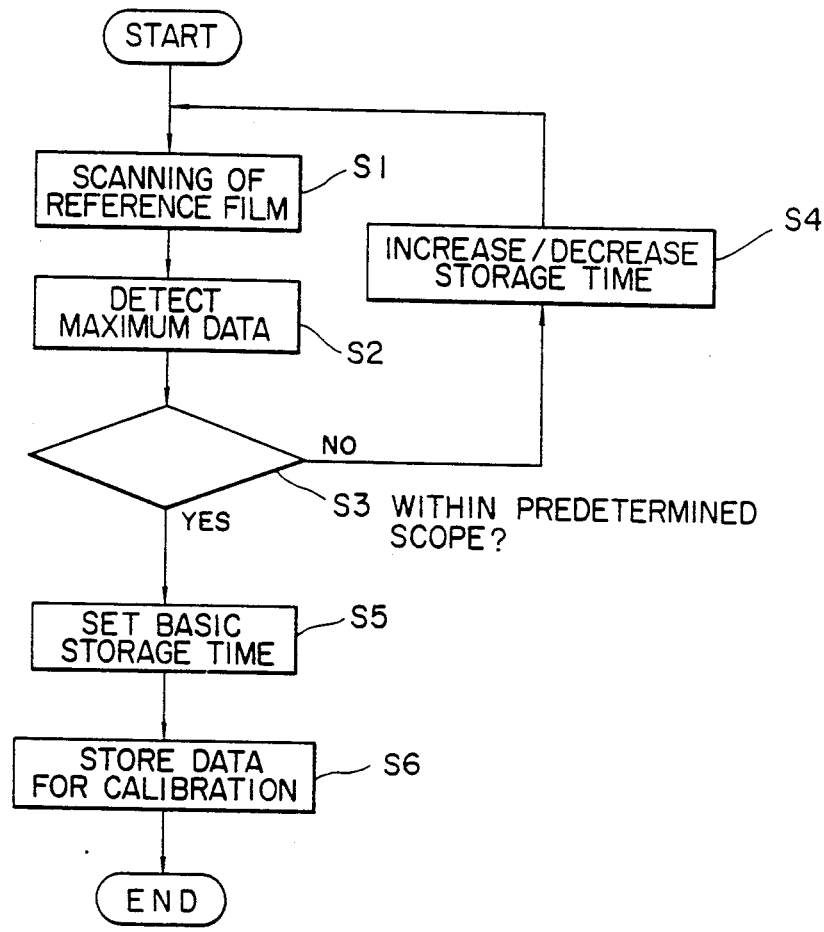
FIG. 7 is a flow chart showing an operation for setting the basic storage time of the image sensor.
Figure 8:
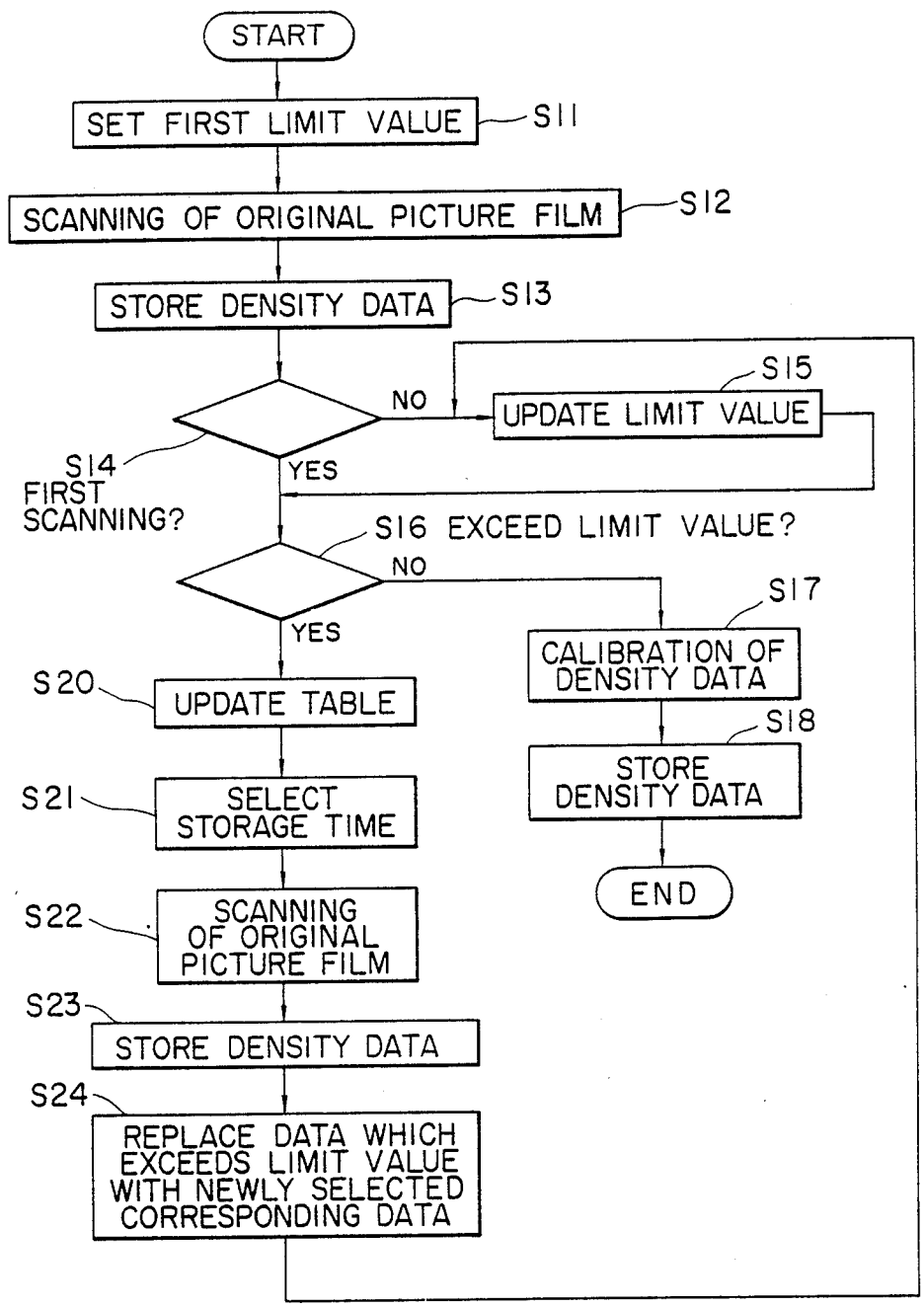
FIG. 8 is a flow chart showing one example of on the method for reading out the image information with the image sensor.

Referring to the flow charts shown in FIGS. 7 and 8, the operation according to this invention is now described.

In FIG. 7, the above mentioned basic storage time TB is first set; a reference film of the type same as the negative film (original picture film) from which image information is detected; an unimaged portion of the negative film is conveyed to the detecting section, the anti-logarithmic table 242 is selected, and the reference film is scanned at a predetermined storage time (for instance the minimum time of the rated value) with the image sensor 10 (Step S1); and the brightest portion of the reference film or the largest data is detected (Step S2). Whether or not the maximum data remained within a predetermined scope or the brightness of the brightest portion of the reference film remains in the predetermined scope is judged (Step S3); and if it does not remain in the predetermined scope, the storage time is increased/decreased (Step S4). More particularly, if the maximum data is smaller than the lower limit of the predetermined scope, the storage time should be prolonged to increase storage while the maximum data is larger than the upper limit, it should be decreased to reduce the storage. In either case, the above operation is repeated until the maximum data comes inside the predetermined scope. When the maximum data of the reference film is set within the predetermined scope, the basic storage time TB of the image sensor 10 is set (Step S5).

When the basic storage time TB has been set, the table #0 of the logarithmic table circuit 24 is selected (refer to FIG. 5), data for calibration is photometrically measured from the reference film under the same condition and the data thus obtained such as the one shown in FIG. 9B is stored in the memory 23 (Step S6). This is conducted for eliminating shading in the optical system or fluctuation of pixels of the image sensor 10. If the pre-scanning is not to be conducted, the table #0 (refer to FIG. 5) is selected first out of the logarithmic table circuit 24 after having photometric measurement and storing of the calibration data, and the first limit value for resolution therefor is set (Step S11); the original picture film is scanned for the first time at the basic storage time (Step S12); and the density data as shown in FIG. 10A is stored in the memory 23 (Step S13). Consequently, whether this is the first scanning or not is judged (Step S14); and if it is not, the limit value for resolution inside the table is updated (Step S15); but if it is the first scanning, whether or not one of the photometric data exceeds the preset limit value for resolution is judged (Step S16). In the case of FIG. 10A, the limit value for resolution of the table #0 is "77", and there are data exceeding the values (hatched and double-hatched portions), the logarithmic table is suitably updated to a step number which is close to the margin and has sufficient resolution (Step S20); and a storage time of the image sensor 10 in correspondence to the newly selected logarithmic table number is selected (Step S21). Then, original picture film is scanned similarly (Step S22); the density data therefrom is stored in the memory 23 (Step S23); the data which exceeds the limit values for resolution of the first photometric data are replaced with the newly selected corresponding data (Step S24); and the procedure returns to the above the processing Step S15.

The above photometric operation is repeated. In the table #5 which has the limit value for resolution of "133" as shown in FIG. 10B, one (double-hatched portion) of the photometric data exceeds the value "133"; but the table #10 shown in FIG. 10C has no photometric data which exceeds the limit value "192". When the steps comes to the table #10, the steps for renewal of logarithmic table and selection of storage time and photometric measurement based thereupon are suspended and the data in the memory 23 are replaced to have the state shown in FIG. 10D. As at the table #10, all of the photometric data are below the limit value "192", procedure proceeds from the Step S16 to S17 wherein density data is calibrated by subtracting the calibration data shown in FIG. 9B from the photometric data shown in FIG. 10D. More particularly, as FIG. 9B shows the data collected by the image sensor 10 when there is no original film mounted, and therefore, density data as shown in FIG. 9C can be obtained by subtracting the data of FIG. 9B from the photometric data at high resolution shown in FIG. 9A which correspond to FIG. 10D for each pixel. These are the final density data to be stored in the memory 23 (Step S18). Those operation of reading out or calibrating image information may be conducted for the unit of three colors of R (red), G (green) and B (blue) by using mosaic filters (not shown) closely attached on the image sensor. The means may be arbitrarily selected to suit the mode in use of image information.

As described above, logarithmic tables set inside the logarithmic table circuit 24 are selected with the selective signals SL from the controlling means 3. The image signals PS from the image sensor 10 are converted therefore to the logarithmic table density values X in correspondence to the storage time.

Figure 3:
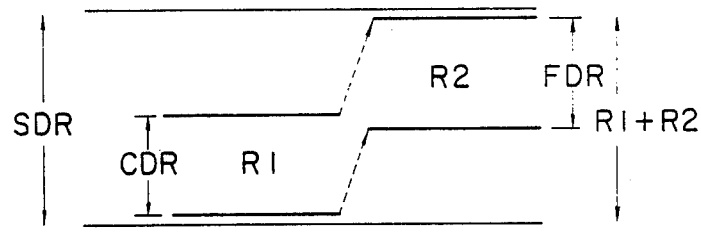
FIG. 3 is an explanatory view for dynamic ranges, of the image sensor.

The image information PS is adjusted in sensitivity by repeating the charge storage alone for several times during the photoelectric conversion, and conversion tables corresponding to output signals are switched in correspondence to the preset number of repetition, so that the scope of dynamic range FDR required for the high density images shown in FIG. 3 is selected and corresponded thereby to enable the system to have a wide dynamic range of SDR. Further, by sequentially updating repetition numbers for sensitivity adjustment, sequentially updating conversion tables corresponding to the output signals and synthesizing image information in the unit of a pixel, image information can be read out at high resolution in a wide dynamic range or the comprehensive dynamic range SDR as shown in FIG. 3. In the above example, photoelectric conversion/storage mode is repeated for scanning of two frames or for the two vertical synchronous signals Vsync, but it could be set at an arbitrary number to adjust storage time thereby to enable the system dynamic range to be modified freely. More specifically, as the storage time of the image sensor 10 is controlled in synchronization with the vertical synchronous signals Vsync, the sensitivity of the image sensor 10 can be enhanced in proportion to the multiple by an integer of the basic time necessary for the scanning for one frame to easily achieve sensitivity improvement and expansion of dynamic range.

Figure 11:
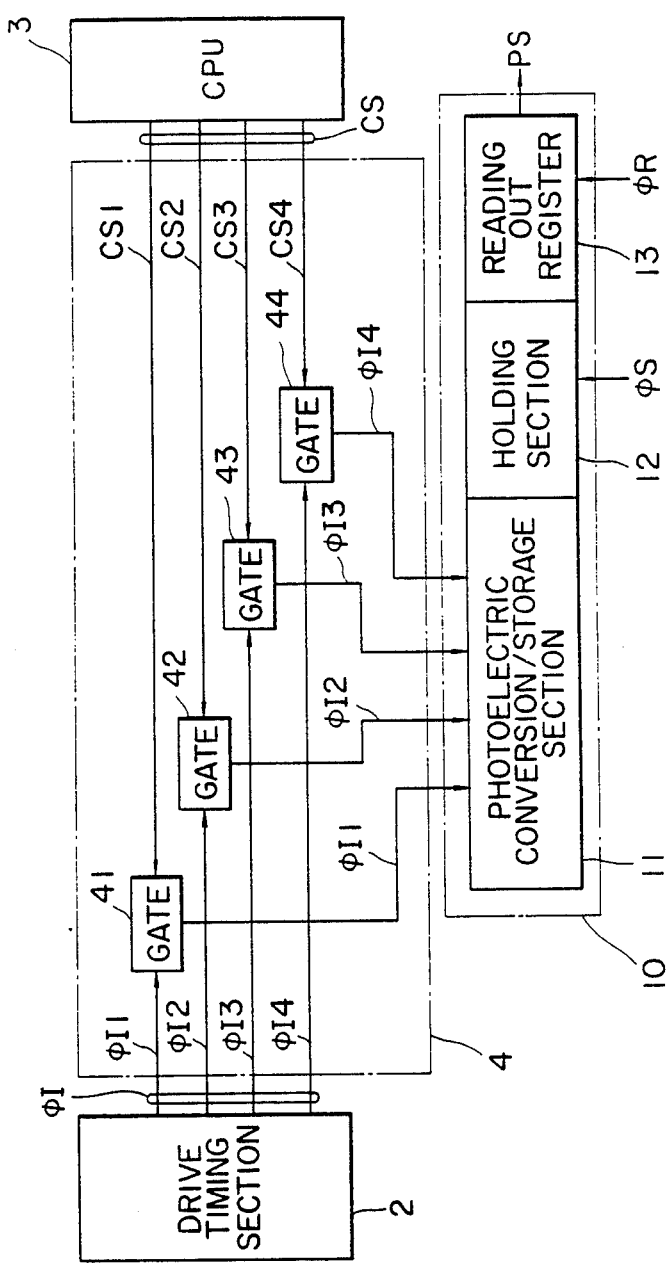
FIG. 11 is block diagram showing one exaple of a gate circuit.

FIG. 11 shows an embodiment of the gate circuit 4. The gate circuit 4 comprises four gates 41 through 44. The phase signals $\phi I1$ from the drive timing section 2 are respectively inputted to gates 41 through 44, and the controlling signals CS from the controlling means 3 are divided into four phases (CS1 through CS4) and inputted to the gates 41 through 44, respectively. When the controlling means 3 does not output the controlling signals CS1 through CS4, the phase signals $\phi I1$ through $\phi I4$ from the drive timing section 2 pass through the gates 41 through 44 respectively to be inputted to the photoelectric conversion/storage section 11. When the controlling signals CS1 through CS4 are outputted from the controlling means 3 at above timings, the outputs $\phi I1$ through $\phi I4$ are fixed at predetermined logical levels respectively, and the image sensor 10 conducts above mentioned photoelectric conversion/storage. Therefore, during the continuous photoelectric conversion/storage, holding and reading out of space charges are conducted without being limited, and image data after the photoelectric conversion/storage alone are taken into the operational processing section 20 in synchronization with the phase signals $\phi S$ and $\phi R$.

The storage time of the image sensor 10 may be set independently from the basic time of the mode of photoelectric conversion storage may be continuously conducted for the number of present clocks.

In the above description, the driving signals ($\phi I$, $\phi S$ and $\phi R$) of the image sensor 10 are of four phases, but those of an arbitrary number of phases may be applicable. Although the holding section and reading out register are inputted respectively with phase signals $\phi S$ and $\phi R$ during the mode of photoelectric conversion/storage, a gate circuit similar to the above may be set to fix each phase signal at a predetermined logical level to thereby completely suspend operations.

In the above embodiments, after photometry and storage of the calibration data, it is the table #0 of the logarithmic table circuit 24 which is first selected, but it is possible to select the anti-logarithmic table 242 instead of the logarithmic table for pre-scanning and to use the anti-logarithmic data obtained by photometry of the calibration data with the basic storage time TB as an address data, then to select the number of the logarithmic table set the limit value for resolution thereof, and to conduct the first scanning of the original film at the corresponding photometric storage time TX. As the minimum pixel density of the image information has been detected by pre-scanning, when the minimum density is high, for instance when the original film is an over-exposed negative film, it becomes possible to start scanning from the table at an intermediate number instead of the number "0". This enables reduction of photometric time and number to enhance efficiency in detection and reading out of the image information. Although the number of the logarithmic table is set at "29" in the above, the number may be determined arbitrarily, and the number of bits or density resolution is not limited to those described in relation to the above embodiments. It is also possible to install a combination of neutral density filters and three complimentary colors of Y (yellow), M (magenta) and C (cyan) in front of the image sensor so that the amount of light may be adjusted to sequentially switch sensitivity instead of switching of storage times especially in the range where the dark current of the image sensor presents a serious problem. The objects of the detection or the ways of lighting are not specified or limited. This invention method may be applicable to the recording in the recording medium such as magnetic tapes, optical discs, magnetic disc films, etc. in a manner similar to the above.

As described in detail in the foregoing statement, this invention permits detection of image information constantly at the optimum conditions in linearity or S/N ratio (signal/noise ratio) by sequentially switching sensitivity for photometry in the range where the resolution of the image sensor is high, and replacing the low resolution pixel data of the photometric data every time. According to this invention method, therefore, image information of a wide dynamic range can be obtained at high resolution without necessity of significant adjustment in sensitivity or offset nor the use of analog logarithmic amplifiers for logarithmic conversion which is expensive and highly dependent on temperature, however with a simple structure and yet achieving a high precision in photometric detection. As three primary color photometry is conducted according to this invention for the colors RGB. when a color of a low sensitivity (for instance blue) is to be photometrically measured, the sensitivity can be increased in the state identical to the colors of high sensitivity (red and green), thereby eliminating the possibility of fluctuation in detection precision but achieving detection and reading out the image information effectively.

Moreover, according to this invention method, the mode photoelectric conversion/storage alone is continuously repeated for the number of present clocks by a storage type photoelectric conversion element for still images, the set number is sequentially updated until the desired storage time is obtained, and a logarithmic table corresponding to the above is selected. Therefore, this invention can provide an effective image information reading method having a wide dynamic range and high resolution sufficient to satisfy conditions for image data processing system which is simple in structure and low in cost and is relatively high in processing speed.

It should be understood that many modifications and adaptations of the invention will become apparent to those skilled in the art and it is intended to encompass such obvious modifications and changes in the scope of the claims appeded hereto.

What is claimed is:

1. A method for reading out image information with a storage type photoelectric conversion element which operates in response to clock pulses in the mode cycle of photoelectric conversion/storage, transfer, holding, and reading out, comprising in the mode of said photoelectric conversion/storage, the mode of the photoelectric conversion/storage alone is continued for a predetermined number of clock pulses, and conversion tables corresponding to the output signal from said storage type photoelectric conversion element are switched in correspondence with said predetermined number of clock pulses, so as to thereby obtain image information of an image having a wide dynamic range.

2. A method for reading out image information with a storage type photoelectric conversion element which operates in responses to clock pulses in the mode cycle of photoelectric conversion/storage, transfer, holding, and reading out, comprising in the mode of said photoelectric conversion/storage, said photoelectric conversion/storage mode alone is repeated for a predetermined number of clock pulses, the predetermined number of clock pulses being changed as to switch the sensitivity of said photoelectric conversion element and to update the conversion table corresponding to the output signal from said storage type photoelectric conversion element, and image data is combined and synthesized in the unit of a pixel, so as to thereby obtain image information at high resolution of an image having a wide dynamic range.

3. A method for reading out image information through detection of digital image data by means of a photoelectric conversion element comprising the steps of:

preparing a plural number of conversion tables for providing values proportional to the logarithms of data outputted from said photoelectric conversion element;

setting a limit value for each of said conversion tables to define a margin of sufficient resolution;

sequentially updating said conversion tables so as to make the photometric data of said photoelectric conversion element remain within the limit value of each of said conversion tables;

sequentially switching sensitivity of said photoelectric conversion element;

photometrically measuring said image information for a plural number of times in the scope of sufficient sensitivity of said photoelectric conversion element; and processing the detected image data for synthesis;

so as to thereby obtain image information at high resolution of an image having a wide dynamic range.

4. A method for reading out image information as claimed in claim 3, wherein said conversion tables contain operational coefficients proportional to logarithms of said input data.

5. A method for reading out image information as claimed in claim 3, wherein said conversion tables contain density values logarithmically said input data at a 1:1 correspondence.

6. A method for reading out image information as claimed in claim 3, wherein said conversion tables contain logarithmic table number proportional to logarithms of said input data at a 1:1 correspondence.

7. A method for reading out image information as claimed in claim 3, wherein said conversion tables are updated in correspondence with the renewal of storage time by using a storage type photoelectric conversion element as said photoelectric conversion element.

8. A method for reading out image information as claimed in claim 3, wherein said conversion tables are updated in correspondence to the adjustment of the amount of light fed to said photoelectric conversion element.

9. A method for reading out image information as claimed in claim 3, wherein one- or two-dimension image sensor is used as said photoelectric conversion element, said image information is detected for each of the pixels obtained by segmenting a frame.

10. A method for reading out image information as claimed in claim 3, wherein said image information is detected for each color in three primary color system of RGB or three complementary color system of YMC.

11. A method for reading out image information through detection of digital image information with a photoelectric conversion element comprising the steps of:

storing calibration data measured photometrically at a reference condition in a memory;

preparing a plural number of conversion tables for each of predetermined ranges and having values proportional to the logarithms of data outputted from said photoelectric conversion element;

setting a limit value for each of said conversion tables to define a margin of sufficient resolution;

sequentially updating said conversion tables so as to make the photometric data of said photoelectric conversion element remain within the limit value of each of said conversion tables;

sequentially switching sensitivity of said photoelectric conversion element;

detecting said image data for a plural number of times in the range of sensitivity with sufficient resolution of said photoelectric conversion element; and synthesizing and processing each of the detected data together with said calibration data so as to form image information.

* * * * *